UNITED STATES PATENT OFFICE 2,225,189

PROCESS AND REAGENT FOR RESOLVING EMULSIONS

Truman B. Wayne, Houston, Tex.

No Drawing. Application July 29, 1938,
Serial No. 222,059

14 Claims. (Cl. 252—336)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent which is water-wettable, interfacial and surface-active in order to enable its employment as a demulsifier or for such uses where water-wettable properties and characteristics are necessary or desirable.

Further objects will appear from the following in which the reagents and the process for their employment will be described as related to their employment for the treating of petroleum emulsions.

The present invention is based on the discovery that many of the substituted polyamines described in my Patent No. 1,860,563, dated May 31, 1932, when condensed with polycarboxy acids, yield highly efficient demulsifiers of the modified synthetic resin type. These substituted amines must, of course, possess reactive hydroxyl groups, or amino, imino, amido or imido groups which can react with more acidic groups to form salts or which are susceptible to acylation.

In the preferred embodiments of the invention the polyamine is first reacted with an organic soap-forming body selected from the group comprising fatty acids, modified fatty acids such as the various sulfuric acid modified fatty bodies now well known in the art of breaking emulsions, other types of modified fatty bodies formed by oxidation, hydroxylation, and partial decomposition by blowing with air, treating with oxidizing agents, halogens followed by hydrolysis, or dry distillation in vacuo, etc., sulfo-aromatics of the Twitchell type and related substances, and various sulfonic acid bodies such as aromatic sulfonic acids from coal tar and petroleum origin, alkyl sulfonic acids, and other acidic bodies capable of forming salts and/or acyl derivatives of polyamines. Preferably, these acidic bodies are hydroxylated and for this reason polyamide derivatives of ricinoleic acid are the preferred bodies used for subsequent condensation with the polycarboxy acid.

The polycarboxy acids or their corresponding anhydrides are suitable. Use of the anhydride facilitates the reactions and produces a product containing a minimum of unreacted starting materials. Among suitable polycarboxy acids are phthalic, terephthalic, diphenic, succinic, citric, malic, maleic, fumaric, adipic, tartaric, oxalic, pimelic, suberic, azelaic, and sebacic acids or their anhydrides.

Primary polyamines such as ethylene diamine, diethylene triamine, triethylene tetramine, and other analogous propylene, butylene, amylene, or hexylene polyamines may be used. These amines may be converted into secondary or tertiary amines by substitution of alkyl, cycloalkyl, aryl, and aralkyl radicals for one or more of the hydrogen atoms of their amino groups. If more than one group is substituted, the substitution preferably should be symmetrical; that is, one of the amino groups should not be completely substituted to tertiary form while another amino group on the same molecule is not substituted. By substituting one hydrogen in each amino group by alkyl, cycloalkyl, aryl, or aralkyl groups, each residual imino group is still capable of acylation by one acidic soap-forming body. If this body is hydroxylated, the presence of one or more hydroxyl groups on each acyl residue presents a favorable structure for resin formation when reacted with the polycarboxy acids.

Obviously, also, if the substituting alkyl, cycloalkyl, aryl, or aralkyl group is hydroxy, further opportunities are presented for resinification when reaction occurs with the polycarboxy acid.

Structurally, these principles may be illustrated as follows:

A polyamine, for instance diethylene triamine, is reacted with three molecules of ricinoleic acid according to the following scheme:

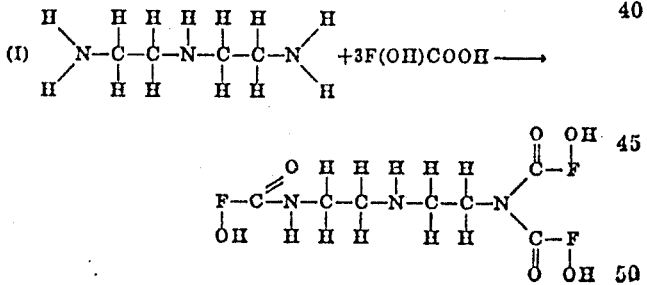

wherein F(OH) is the hydroxylated fatty hydrocarbon chain derived from ricinoleic acid. The triricinolelyl amide of the polyamine is then reacted with from one to three molecules of phthalic anhydride as follows:

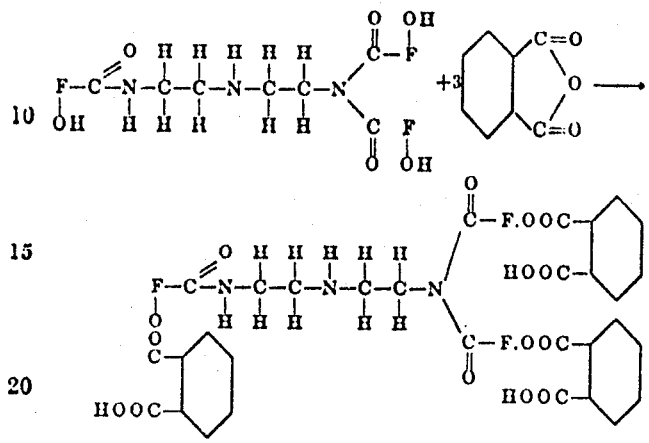

The above structural formula is, of course, the simplest form, as it is well known in the preparation of glyptal resins from polycarboxy acids and hydroxy bodies that more complex bodies are formed through reactions of partial esterification products. Furthermore, these reactions can be carried to the point where the residual carboxyls will acylate the remaining imino or imido groups, or they may be esterified with other hydroxy or aminic bodies.

The remaining hydrogen atoms attached to the nitrogen atoms of the amine or amino residue may subsequently be replaced by alkyl, cycloalkyl, aryl, or aralkyl groups, or the polyamine may have previously been substituted before preparing the amide, as described in my earlier Patent No. 1,860,563, dated May 31, 1932.

Similar products are formed by first reacting a polyamine with a non-hydroxy fatty body, or other acidic non-hydroxy body of high molecular weight, and subsequently reacting the fatty polyamide with a polycarboxy acid. This reaction product differs from the one previously shown in that the carboxyl groups of the polycarboxy acid react directly with the imido groups instead of with hydroxyl groups attached to the fatty acid residue. A polyamine, such as ethylene diamine, is first reacted with two molecular proportions of oleic acid. The dioleyl amide is first formed. The amide is subsequently condensed with one or two mols of phthalic acid.

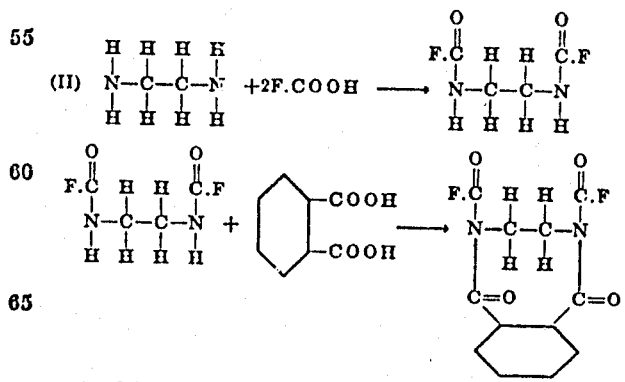

A third modification of this general class of substances comprising the reaction product of a substituted polyamine and a polycarboxy acid is illustrated below:

A polyamine such as ethylene diamine or any of its higher homologues is first substituted by one or more hydroxy-alkyl residues derived from diol or triol chlorohydrins, glycidol, alkylene oxides, or from glycol or glycerol ether chlorodrins. The resulting substituted polyamine, taining one or more hydroxyl groups, is the acted with one or more molecular equivalen a fatty acid. The acid may be non-hydro character such as oleic, linoleic, linolenic, et may be a hydroxy acid such as hydroxy-s acid or ricinoleic acid. Either the polyamine formed by simple neutralization, or the polya is suitable. The resulting product is then densed with a polycarboxy acid to form a r ous or semi-resinous product. These reac are illustrated as follows:

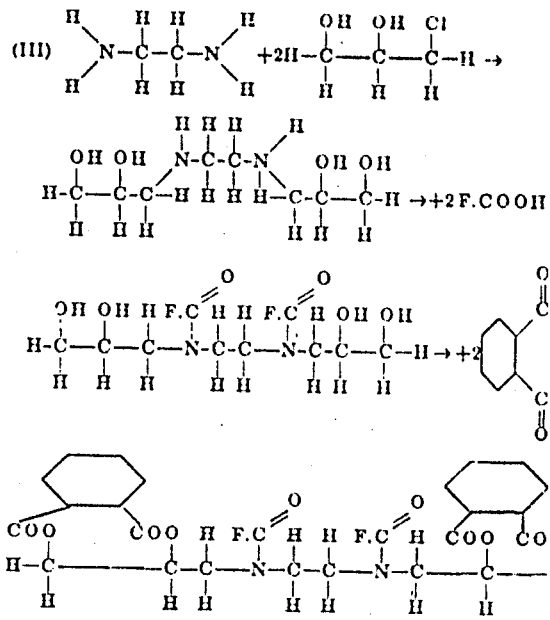

Substitution of the polyamine can, of cor be done with glycol chlorohydrins having only hydroxyl group per molecule. Likewise instea two molecules of non-hydroxy fatty acid, only or even three or more molecules of fatty may be used to replace the hydrogens of amino residues, or even to esterify part of hydroxyl groups. Instead of non-hydroxy f acids, hydroxy acids such as ricinoleic or droxy-stearic acid may be used. Fewer or r than two molecules of phthalic acid or its ar dride may be used. Instead of completely es ifying the polycarboxy acid, only half esters be prepared. The degree of esterification is course, determined by the time and degree heating, the presence of catalysts, and/or vision for carrying water of reaction out of reaction mixture. Other polycarboxy acids be substituted for phthalic, or a plurality of s acids may be used.

The distinguishing structural characteristic the new type of petroleum demulsifiers he disclosed are one or more polyamine residues c bined either as a soap or amide with one or n fatty acid groups per molecule of amine, the resulting soap or amide is then conder through either hydroxyl or replaceable hydro atoms with one or more molecular equivalent a polycarboxy acid.

Briefly, the structural characteristics of new demulsifiers may be represented by the t formula

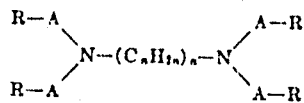

wherein A may be hydrogen, alkyl, cycloal aryl, aralkyl, or residues from sulfonic acids, fa carboxylic acids, or polycarboxylic acid; R rep sents a polycarboxy acid residue, hydroxyl or hydrogen; and n represents the number 1 or more. Reference to the preceding detailed structural formulas in I, II, and III more fully explains the above type formula. A $SO_3H$ or an $OSO_3H$ group may be present at A provided A is anything shown above excepting hydrogen. It may also be present at R provided R is a sulfo-phthalic, sulfo-succinic, or similar sulfo polycarboxy acid group. More than one sulfo group can be present in the structure of the finished product by the simple means of using sulfonic, sulfo-fatty, or sulfo-polycarboxylic acids at any of the A positions, or sulfo-polycarboxylic acids at one or more of the R positions. Of course, the sulfo group may be attached to the nitrogen atom, N, where sulfo-fatty or sulfo-polycarboxylic acids are used to neutralize or acylate the amino group, or may intervene between R and A where R is used to esterify a hydroxyl group on a hydroxy fatty acid or hydroxy alkyl or aralkyl group represented by A.

In order to illustrate specifically the new type of condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their various derivatives, or other proportions may be employed without departing from the spirit of the invention or the scope of the appended claims.

*Example 1*

596 parts by weight of ricinoleic acid (or 624 parts of castor oil), 125 parts of anhydrous technical polyethylene amines consisting mainly of diethylene triamine, and 300 parts of solvent naphtha B. P. 150–230° C., were heated to 100–110° C. for three hours to form the polyamine soap of rincinoleic acid. To the clear soap were added 296 parts of phthalic anhydride, and the temperature held at 120–130° C. for 2 to 6 hours to form an addition product between the anhydride radical and the hydroxyl group of the ricinoleic acid. No water of reaction was formed, so no acylation reactions occurred. The remaining carboxyl groups may be allowed to remain in the free state, or may be neutralized with a base or converted into an ester or amine. The finished product is preferably diluted with isopropanol to regulate the viscosity to the desired point.

*Example 2*

1021 parts of the product prepared according to Example 1 are heated to 133° C. where water began to distill over. At 180° C. 30 parts of water had formed, and at 195° C. the theoretical yield of 36 parts of water had been obtained. This was formed from amide formation as a result of dehydrating the polyamine soap. No water could form from esterification as the anhydride radical of the polybasic acid compound simply forms an addition product. However, if the remaining carboxyls are amidized or esterified, additional water will be formed.

*Example 3*

596 parts of ricinoleic acid (or 624 parts of castor oil), 125 parts of anhydrous technical diethylene triamine, and 300 parts of sulfur dioxide extract were heated to 140° C. in the presence of 10 parts of concentrated sulfuric acid as a catalyst. Water formation begin at this temperature, and continued throughout a gradual temperature rise until a theoretical yield of 36 parts of water had been obtained when the temperature reached 223° C. at atmospheric pressure. To the diricinoleyl polyamide compound was added 140 parts of phthalic anhydride and the mass was heated to 183° C. where the first drop of water of esterification appeared. The temperature was gradually raised as distillation of water proceeded, and the theoretical yield of 18 parts of water was obtained at a final temperature of 230° C. ince both carboxyls of the phthalic molecule were esterified, no further neutralization or esterification fas possible.

*Example 4*

700 parts of castor oil, 300 parts of sulfur dioxide extract or solvent naphtha, and 296 parts of phthalic anhydride were heated together at 150° C. for six hours to form the half ester of castor oil and phthalic acid. To this was added 125 parts of anhydrous technical diethylene triamine and the mixture was heated at 110° C. for four hours. This procedure forms the neutralization product wherein the two amino radicals of the polyamine neutralize the two remaining carboxyls of the phthalic acid residues. This product may be diluted with a suitable solvent to regulate its viscosity and used as a remulsifying agent or may be further processed according to Example 5.

*Example 5*

The polyamine salt described in Example 4 was heated for 8 hours at 235° C. to obtain a yield of 36 parts of water from acylation of the two amino groups of the polyamine by the carboxyls of the two phthalyl residues.

*Example 6*

The same as Examples 1, 2, 3, 4 or 5 except that sulfo-ricinoleic acid is used instead of ricinoleic acid or castor oil.

*Example 7*

Same as any of the preceding examples except that phthalic anhydride 4-sulfonic acid is used instead of phthalic anhydride. The final condensation product is neutralized with ammonia or a suitable amine.

*Example 8*

One mol of dibutylethylene diamine is reacted with two mols of ricinoleic acid or sulfo-ricinoleic acid at 220–220° C. to form the di-amide. This product is then reacted with two mols of maleic anhydride at 125–150° C. to form the addition product. The remaining carboxyls are then neutralized with an amine or converted to an N-alkylated amide by heating the amine salt under conditions which split off water of amidization.

*Example 9*

One mol of ethylene diamine is heated with two mols of glycol mono-chlorohydrin for several hours and then made alkaline. The oily hydroxylated polyamine was removed and dried. To it were added 570 parts of oleic acid and 300 parts of solvent naphtha, and the di-amide was formed by heating at 200–230° C. to remove the water formed by dehydration of the diamine soap. To the amide was added 296 parts of phthalic anhydride and the heating was conducted at 125–150° C. for six hours.

*Example 10*

Same as Example 9 except that phthalic anhydride 4-sulfonic acid was used instead of phthalic anhydride.

*Example 11*

646 parts of a technical mixture of oleic, linoleic, linolenic and abietic acids derived from pine, and commonly known as "tall oil" (or "tallol"), and being non-hydroxy in character, were heated with 125 parts of technical diethylene triamine, 200 parts of sulfur dioxide extract or solvent naphtha, and 10 parts of concentrated sulfuric acid as a catalyst. Water began to form at 145° C. and at 198° C., 36 parts, or theoretical yield, of water had been obtained. To the di-amide was added 148 parts of phthalic anhydride and heated to 147° C. where water began to distill over. After eight hours at 210° C. only 16 parts of water had distilled over. The temperature was raised to 235–245° C. to obtain the remaining 20 parts of water, totaling 36 parts, the theoretical yield. Ninety parts of isopropanol were added as a diluent to adjust the viscosity of the condensation product.

The above product is somewhat more difficult to prepare because it involves replacement of both hydrogen atoms of each amino group. The amino group is first acylated by the fatty acid, and then subsequently by the carboxyls of the dibasic acid derived from the corresponding anhydride.

The above examples are only a few of the many products which may be prepared according to the principles disclosed in the foregoing discussion. While sulfonation is preferably done on one or more of the reacting constituents or ingredients prior to formation of the final, complex, resinous or semi-resinous product, it should be readily understood that sulfonation may be applied to the final product.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include $OSO_3H$ and $SO_3H$ groups, and their neutralization products.

Where reference is made to "fatty acids," it is understood to include aliphatic acids having eight or more carbon atoms in their hydrocarbon chain, rosin and resin acids, naphthenic acids, and the like. The term "soap-forming" refers to these acids and also sulfonic acids derived from various aliphatic, alicyclic, hydroaromatic and aromatic bodies found in, or derived from, coal tar, asphalt, petroleum, etc.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in a small percentage, viz., in the proportion of one part of treating agent to from 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I claim:

1. A petroleum demulsifying composition which comprises as a component a substituted polyamine of the general type

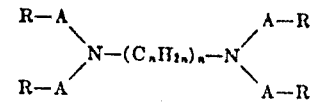

wherein A is hydrogen or an alkyl, cycloalkyl, aryl, or aralkyl group, or residues from sulfonic acids, fatty carboxylic acids, or polycarboxylic acids; R represents a polycarboxy acid residue, hydroxyl, or hydrogen; and $n$ represents the number 1 or more; and $(C_nH_{2n})$ represents an alkylene radical which may also be characterized by the presence of one or more amino residues.

2. A petroleum demulsifying composition which comprises as a component a substituted polyamine of the general type

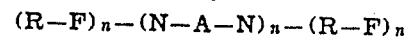

wherein R is a polycarboxy acid residue; F is a fatty carboxylic acid residue; N—A—N is a polyamine residue characterized by the presence of two or more amino residues, N; and one or more alkyl or alkylene residues, A; and $n$ represents the number 1 or more.

3. A petroleum demulsifying composition which comprises as a component a substituted polyamine of the general type

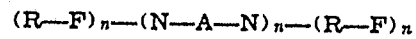

wherein R is a polycarboxy acid residue; F is a fatty carboxylic acid residue; N—A—N is a polyamine residue characterized by the presence of two or more amino residues, N; and one or more alkyl or alkylene residues, A; and $n$ represents the number 1 or more; and R is further characterized by the presence of a sulfo group.

4. A petroleum demulsifying composition which comprises as a component a substituted polyamine of the general type

wherein R is a polycarboxy acid residue; F is a fatty carboxylic acid residue; N—A—N is a polyamine residue characterized by the presence of two or more amino residues, N; and one or more alkyl or alkylene residues, A; and $n$ represents the number 1 or more; and F is further characterized by the presence of a sulfo group.

5. A petroleum demulsifying composition which comprises as a component part a substituted polyamine derived by substituting one or more fatty carboxylic residues and one or more polycarboxy acid residues for the replaceable hydrogens attached to one or more nitrogen atoms of a polyamine of the general type

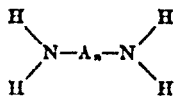

wherein

is an amino group; A is an alkyl or alkylene radical which may be further characterized by the presence of one or more amino residues, and $n$ represents the number 1 or more.

6. A petroleum demulsifying composition which comprises as a component part a polyamine fatty amide of the general type $$F_n—N—A_n—N—F_n$$

wherein F is a residue derived from a fatty carboxylic acid substituted for a hydrogen attached to the amino residue, N; A is an alkyl or alkylene radical which may be further characterized by the presence of one or more amino residues; and $n$ is the number 1 or more; and wherein the fatty amide is further substituted by one or more polycarboxy acid residues.

7. A petroleum demulsifying composition which comprises as a component a water-wettable polyamine compound comprising the reaction product of a polyamine containing at least two amino or imino groups, one or more molecular proportions of a fatty body characterized by the presence of a carboxyl group, and one or more molecular proportions of a polycarboxy acid body.

8. The process of treating petroleum, comprising, treating petroleum with a small percentage of a demulsifying composition having as a component part, a water-wettable substituted polyamine of the general type

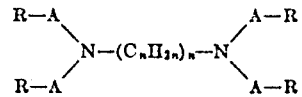

wherein A is hydrogen or an alkyl, cycloalkyl, aryl, or aralkyl group, or residues from sulfonic acids, fatty carboxylic acids, or polycarboxylic acids; R represents a polycarboxy acid residue, hydroxyl, or hydrogen; and $n$ represents the number 1 or more; and $(C_nH_{2n})$ represents an alkylene radical which may also be characterized by the presence of one or more amino residues.

9. The process of treating petroleum, comprising, treating petroleum with a small percentage of a demulsifying composition having as a component part, a water-wettable substituted polyamine of the general type $$(R—F)_n—(N—A—N)_n—(R—F)_n$$

wherein R is a polycarboxy acid residue; F is a fatty carboxylic acid residue; N—A—N is a polyamine residue characterized by the presence of two or more amino residues, N; and one or more alkyl or alkylene residues, A; and $n$ represents the number 1 or more.

10. The process of treating petroleum, comprising treating petroleum with a small percentage of a demulsifying composition having as a component part, a water-wettable substituted polyamine of the general type $$(R—F)_n—(N—A—N)_n—(R—F)_n$$

wherein R is a polycarboxy acid residue; F is a fatty carboxylic acid residue; N—A—N is a polyamine residue characterized by the presence of two or more amino residues, N; and one or more alkyl or alkylene residues, A; and $n$ represents the number 1 or more; and R is further characterized by the presence of a sulfo group.

11. The process of treating petroleum, comprising, treating petroleum with a small percentage of a demulsifying composition having as a component part, a water-wettable substituted polyamine of the general type $$(R—F)_n—(N—A—N)_n—(R—F)_n$$

wherein R is a polycarboxy acid residue; F is a fatty carboxylic acid residue; N—A—N is a polyamine residue chacterized by the presence of two or more amino residues, N; and one or more alkyl or alkylene residues, A; and $n$ represents the number 1 or more; and F is further characterized by the presence of a sulfo group.

12. In the process of treating petroleum, comprising, treating petroleum with a small percentage of a demulsifying composition having as a component part, a water-wettable substituted polyamine of the general type

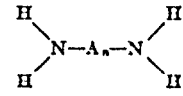

wherein

is an amino group; A is an alkyl or alkylene radical which may be further characterized by the presence of one or more amino residues; and $n$ represents the number 1 or more.

13. In the process of treating petroleum, comprising, treating petroleum with a small percentage of a demulsifying composition having as a component part, a water-wettable substituted polyamine of the general type $$F_n—N—A_n—N—F_n$$

wherein F is a residue derived from a fatty carboxylic acid substituted for a hydrogen attached to the amino residue, N; A is an alkyl or alkylene radical which may be further characterized by the presence of one or more amino residues; and $n$ is the number 1 or more; and wherein the fatty amide is further substituted by one or more polycarboxy acid residues.

14. In the process of treating petroleum, comprising, treating petroleum with a small percentage of a demulsifying composition having as a component part, a water-wettable polyamine compound comprising the reaction product of a polyamine containing at least two amino or imino groups, one or more molecular proportions of a fatty body characterized by the presence of a carboxyl group, and one or more molecular proportions of a polycarboxy acid body.

TRUMAN B. WAYNE.

CERTIFICATE OF CORRECTION.

Patent No. 2,225,189. December 17, 1940

TRUMAN B. WAYNE.

It is hereby certified that error appears in the printed specifica[tion] of the above numbered patent requiring correction as follows: Page 3, [sec]ond column, line 13, for "ince" read --since--; line 15, for "fas" [read] --was--; same page and column, line 30, for "remulsifying" read --den[sifying]--; and that the said Letters Patent should be read with this c[or]rection therein that the same may conform to the record of the case in [the] Patent Office.

Signed and sealed this 18th day of March, A. D. 1941.

(Seal)

Henry Van Arsdale,
Acting Commissioner of Patent[s]

CERTIFICATE OF CORRECTION.

Patent No. 2,225,189. December 17, 1940.

TRUMAN B. WAYNE.

It is hereby certified that error appears in the printed specification of the above numbered patent requiring correction as follows: Page 3, second column, line 13, for "ince" read --since--; line 15, for "fas" read --was--; same page and column, line 30, for "remulsifying" read --demulsifying--; and that the said Letters Patent should be read with this correction therein that the same may conform to the record of the case in the Patent Office.

Signed and sealed this 18th day of March, A. D. 1941.

(Seal)
Henry Van Arsdale,
Acting Commissioner of Patents.